(12) United States Patent  
Nelson et al.

(10) Patent No.: US 11,376,942 B2
(45) Date of Patent: Jul. 5, 2022

(54) TORQUE CONVERTER WITH SEALED TURBINE SHELL AND CLUTCH COOLING

(71) Applicant: SCHAEFFLER TECHNOLOGIES AG & CO. KG, Herzogenaurach (DE)

(72) Inventors: Kyle Nelson, Dover, OH (US); Victor Norwich, Wooster, OH (US)

(73) Assignee: SCHAEFFLER TECHNOLOGIES AG & CO. KG, Herzogenaurach (DE)

(*) Notice: Subject to any disclaimer, the term of this patent is extended or adjusted under 35 U.S.C. 154(b) by 375 days.

(21) Appl. No.: 16/728,140

(22) Filed: Dec. 27, 2019

(65) Prior Publication Data
US 2021/0197657 A1 Jul. 1, 2021

(51) Int. Cl.
*B60K 6/387* (2007.10)
*F16H 57/04* (2010.01)
*B60K 6/26* (2007.10)
*B60K 6/44* (2007.10)

(52) U.S. Cl.
CPC ............... *B60K 6/387* (2013.01); *B60K 6/26* (2013.01); *F16H 57/0412* (2013.01); *F16H 57/0473* (2013.01); *B60K 6/44* (2013.01); *B60Y 2200/92* (2013.01); *B60Y 2400/426* (2013.01)

(58) Field of Classification Search
CPC .. B60K 6/387; B60K 6/26; B60K 6/44; F16H 57/0412; F16H 57/0473; B60Y 2200/92; B60Y 2400/426
See application file for complete search history.

(56) References Cited

U.S. PATENT DOCUMENTS

| | | | |
|---|---|---|---|
| 8,967,352 B2 * | 3/2015 | Kummer | F16D 21/06 192/85.25 |
| 2007/0175723 A1 * | 8/2007 | Blessing | F16D 25/0638 192/48.8 |
| 2019/0044410 A1 | 2/2019 | Vanni et al. | |

OTHER PUBLICATIONS

U.S. Appl. No. 62/717,054, filed.

* cited by examiner

*Primary Examiner* — John D Walters
(74) *Attorney, Agent, or Firm* — Lekeisha Suggs

(57) ABSTRACT

A hybrid module for a hybrid vehicle is disclosed. The hybrid module has two clutches located radially inward of an electric motor, and in their own respective fluid chamber. Fluid from one chamber can cool one of the clutches. Then the fluid can travel axially to the other chamber to cool the other clutch. The hybrid module can include a wall assembly between the two clutches, separating the fluid chambers. After the fluid cools both clutches, the fluid is directed to the wall assembly, and passes through two walls, radially outwardly, to spray onto the electric motor to cool the motor.

20 Claims, 2 Drawing Sheets

TORQUE CONVERTER WITH SEALED TURBINE SHELL AND CLUTCH COOLING

TECHNICAL FIELD

The present disclosure relates to a clutch assembly and torque converter for implementation into a hybrid electric vehicle.

BACKGROUND

Many vehicles include a launch device between the engine and the transmission. A torque converter is a type of launch device commonly used in vehicles having an automatic transmission. In a hybrid electric vehicle, an electric motor may also be provided between the engine and the transmission. Various clutches may be provided to selectively allow the torque converter to receive torque from the engine when the engine is powering the vehicle. In some instances, the clutches can also be controlled to open and allow the motor to drive the vehicle while bypassing the torque converters.

SUMMARY

In one embodiment, a hybrid module for a hybrid vehicle includes a first fluid chamber located axially between a reaction plate and a first piston, and radially inward of an electric motor; a first clutch configured to mount radially inward of the electric motor, wherein the first piston is configured to slide axially to engage the first clutch to non-rotatably couple an input shaft to the electric motor in response to fluid pressure provided in the first fluid chamber; a second fluid chamber located axially between the first piston and a second piston and radially inward of the electric motor; a second clutch configured to mount radially inward of the electric motor, wherein the second piston is configured to slide axially to engage the second clutch to non-rotatably couple the electric motor to a transmission input shaft; a torque converter configured to mount radially inward of the electric motor, the torque converter having a turbine shell; and a third fluid chamber located axially between the second piston and the turbine shell, wherein the second piston is configured to slide axially to engage the second clutch in response to fluid pressure provided in the third fluid chamber.

According to another embodiment, A hybrid module for a hybrid vehicle includes a first clutch configured to, when actuated, non-rotatably couple an input shaft to an electric motor; a second clutch configured to, when actuated, non-rotatably couple the electric motor to a transmission input shaft; an electric-motor housing configured to house the electric motor, the electric-motor housing having a radially-inner portion; and a torque converter including a turbine shell slidably disposed along the radially-inner portion of the electric-motor housing via a seal.

According to another embodiment, a method of cooling a hybrid module of a hybrid vehicle includes transmitting fluid through a housing and into a first fluid chamber that has a first clutch located radially inward of an electric motor; transmitting the fluid radially outwardly to cool the first clutch; directing the fluid from the first fluid chamber into a second fluid chamber that has a second clutch located radially inward of the electric motor; transmitting the fluid radially inwardly to cool the second clutch; and directing the fluid from the second fluid chamber into a wall assembly that axially separates the first and second fluid chambers.

DETAILED DESCRIPTION

Figure 1:
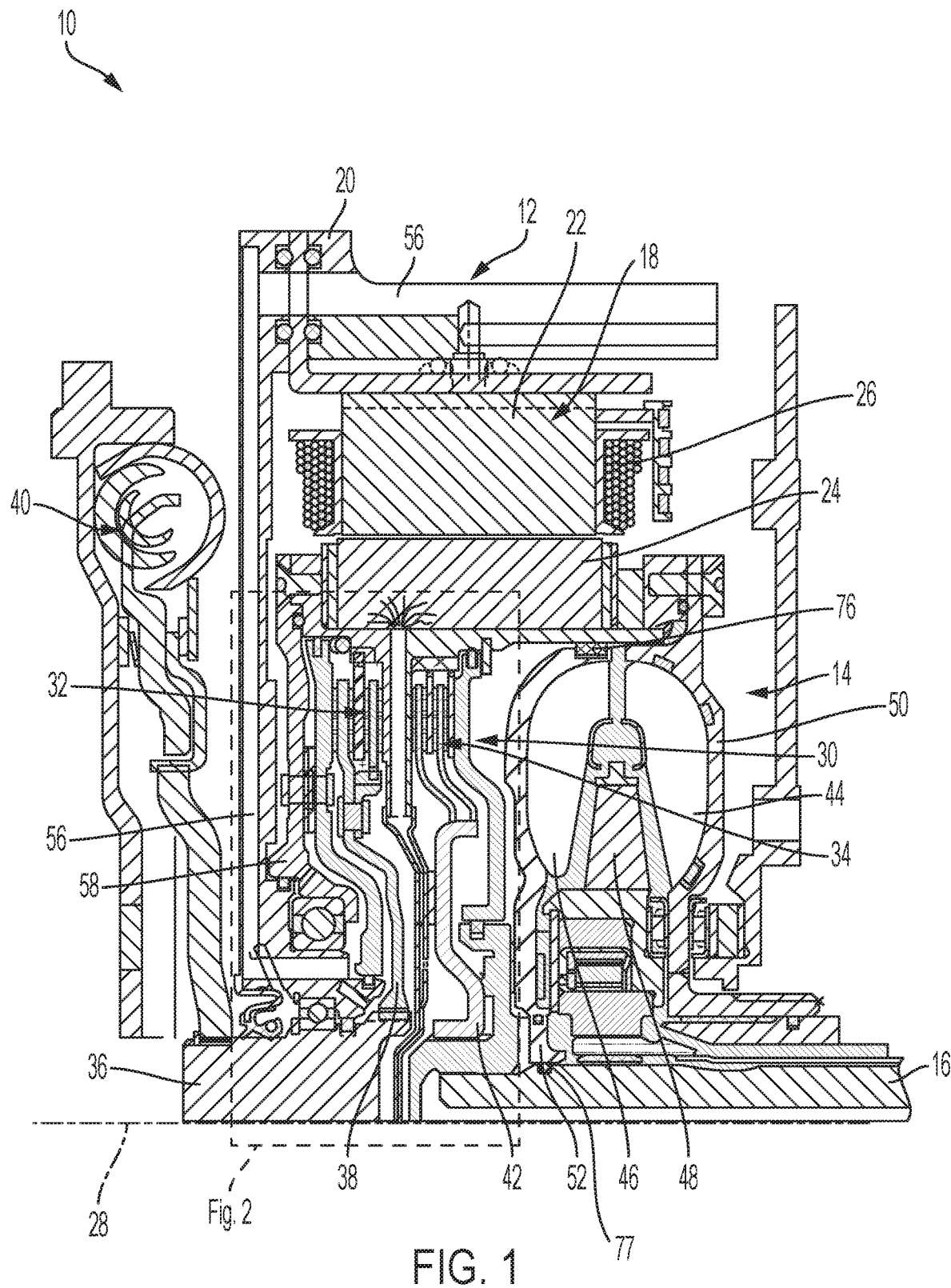
FIG. 1 illustrates a cross-sectional view of a hybrid module for a vehicle, according to one embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Directional terms used herein are made with reference to the views and orientations shown in the exemplary figures. A central axis is shown in the figures and described below. Terms such as "outer" and "inner" are relative to the central axis. For example, an "outer" surface means that the surfaces faces away from the central axis, or is outboard of another "inner" surface. Terms such as "radial," "diameter," "circumference," "axial," etc. also are relative to the central axis. The terms "front," "rear," "upper" and "lower" designate directions in the drawings to which reference is made. The term "drivably" is also used herein and is intended to mean that two components rotate together due to a power or torque provided thereto; there may be small amounts relative movement between the two drivably-connected components, but a drivable connection is one in which rotation of one component causes the other component to rotate.

A hybrid electric vehicle (HEV), also referred to as a hybrid vehicle, typically includes an internal combustion engine providing a first source of drive power, and an electric motor providing a second source of drive power. Hybrid modules have been designed to selectively drivably connect the engine to the wheels, the motor to the wheels, and/or both the engine and the motor to the wheels. Hybrid modules may include one or more clutches and a torque converter that separate the drive power flow from the engine and motor to a transmission.

Packaging is constrained within a hybrid module. If the torque converter is made smaller, this limits the torque capacity, requiring a torque converter clutch to lock quickly to carry the full combined torque of the engine and motor. With this, clutch control is critical to lockup the torque converter clutch as soon as possible to keep the torus of the torque converter cool, and operate in an efficient manner for fuel economy.

According to embodiments disclosed herein, a hybrid module is provided having a four-pass torque converter clutch functionality with the addition of only one port, as compared to two additional ports typically required (e.g., clutch apply port and clutch compensation port). Moreover, both the engine disconnect clutch and the torque converter clutch can be efficiently packaged radially inward of the motor.

Figure 2:
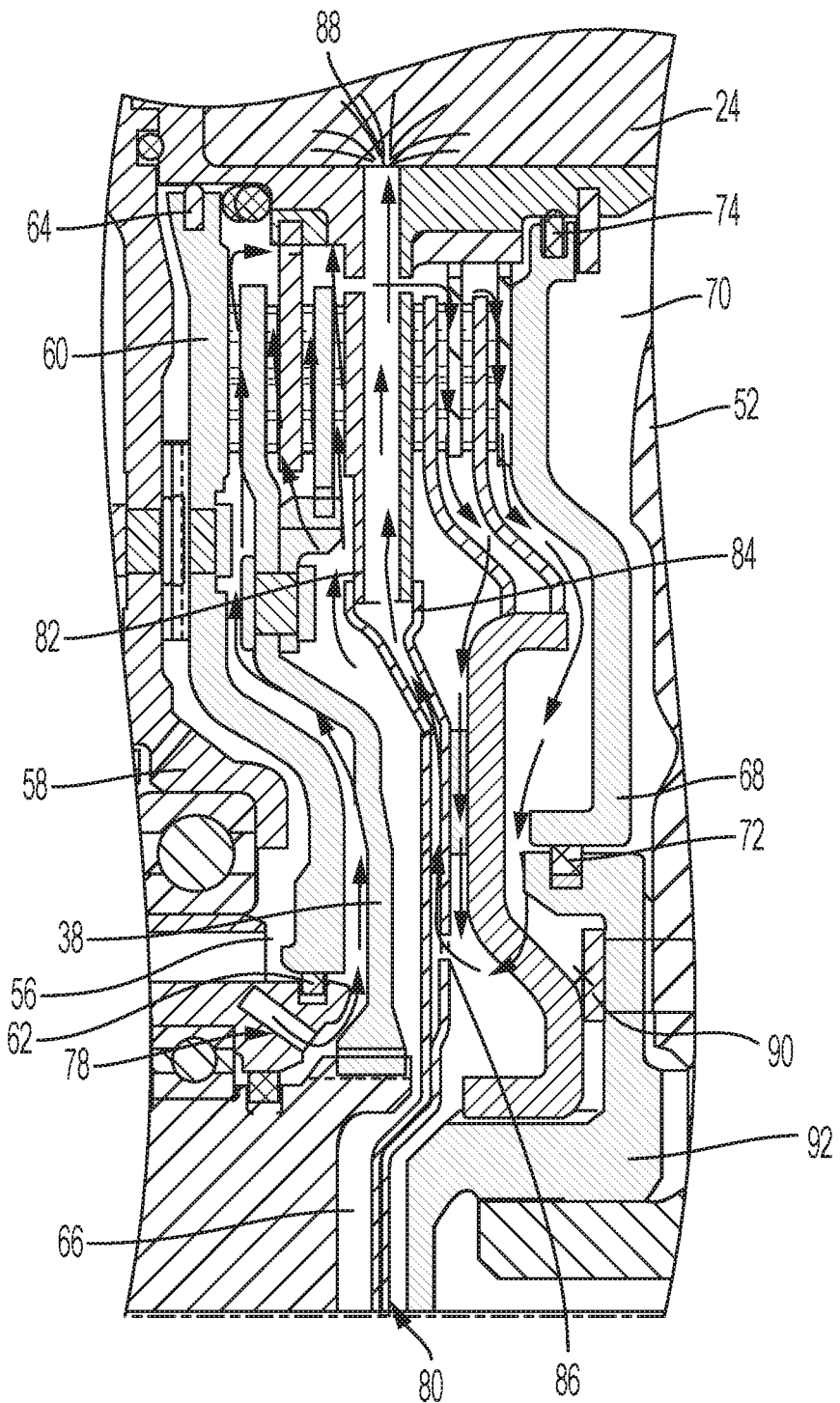
FIG. 2 shows an enlarged region of FIG. 1 with flow arrows illustrating a flow of fluid within clutches of the hybrid module, according to one embodiment.

FIG. 1 shows a cross-sectional view of a hybrid module 10 according to one embodiment of the present disclosure, and FIG. 2 shows an enlarged region of FIG. 1. The hybrid module 10 is configured for a passenger vehicle, such as a car, a truck, a van, a sports utility vehicle (SUV), and the like. The hybrid module 10 can be fitted in a powertrain of the vehicle, drivably between an engine (not shown) and a transmission. The hybrid module 10 includes a hybrid drive unit 12 configured to attach to the internal combustion engine, and a torque converter 14 configured to attach to a transmission input shaft 16. The hybrid drive unit 12 also includes an electric motor 18 for selectively driving the vehicle in either a full-electric mode (in which the motor 18 drives the vehicle and the engine is off or disconnected from the transmission), and a hybrid mode (in which the engine drives the vehicle and the motor provides additional power or torque to the transmission). In some embodiments, the electric motor 18 can act as a generator to recapture kinetic energy into electric energy stored in a battery (not shown). The hybrid module 10 therefore assists—and sometimes replaces—engine torque with electric motor torque, thereby improving fuel efficiencies of the vehicle.

The hybrid module 10 includes a housing 20. The housing is arranged for fixing to a transmission such as a planetary transmission or continuously-variable transmission (CVT) (not shown) and the engine (not shown). The electric motor 18 is disposed in the housing and includes a stator 22 fixed (e.g., bolts) to the housing 20, a rotor 24 rotatable relative to the housing 20 and the stator 22, and coils 26. In one embodiment, upon current being provided to coils 26, the rotor 24 is rotated about a center axis 28 of the hybrid module 10 due to the rotor 24 having a plurality of permanent magnet segments that are energized by the current in the coils 26.

A hydraulic coupling 30 is disposed in the housing 20. The hydraulic coupling 30 may be located at least partially radially inside the electric motor 18, and axially forward (e.g., to the left in FIG. 1) of the torque converter 14. The hydraulic coupling 30 may include two clutches, namely a first clutch 32 and a second clutch 34. The first clutch 32, also referred to as a disconnect clutch, is configured to selectively drivably connect the rotor 24 with the engine. In particularly, within the first clutch 32, a first set of clutch plates (e.g., inner clutch plates) is non-rotatably coupled to a hybrid module input shaft 36 via plate 38, while a second set of clutch plates (e.g., outer clutch plates) is directly coupled to the rotor 24. The hybrid module input shaft 36 may be an output of a flywheel assembly or dampener assembly, generally shown at 40. The damper assembly 40 is configured to receive torque from the engine and transfer torque to the hybrid module input shaft 36. The second clutch 34, also referred to as torque converter clutch or a bypass clutch, is configured to selectively drivably connect the rotor 24 to the transmission input shaft 16. In particular, within the second clutch 34, a first set of clutch plates (e.g., inner clutch plates) is non-rotatably coupled to the transmission input shaft 16 via plate 42, while a second set of clutch plates (e.g., outer clutch plates) is non-rotatably coupled to the rotor 24.

The torque converter 14 includes an impeller 44, a turbine 46, and a stator 48. The impeller 44 is formed by a rear cover 50 or impeller shell and includes a plurality of impeller blades formed or supported therein. The turbine 46 is formed by a front cover or turbine shell 52 and includes a plurality of turbine blades formed or supported therein. The turbine 46 is moveable axially toward and away from the impeller 44. In particular, the turbine shell 52 is slidable relative to the input shaft 16. The stator 48 is situated axially between the turbine 46 and the impeller 44 to redirect fluid flowing from the turbine blades before the fluid reaches the impeller blades to increase the efficiency of the torque converter 14.

Referring to FIG. 2, the hydraulic coupling 30 and its surrounding structure includes various fluid chambers and passages, separated axially by various plates and walls. A first fluid chamber 56, also referred to as a disconnect clutch apply chamber, is an apply chamber for the first clutch 32. The first fluid chamber 56 is located axially between a fluid reaction plate 58 (also referred to as a reaction plate) and a piston 60 of the first clutch 32. Fluid in the first fluid chamber 56 is routed thereto through the housing 20 of the hybrid module 10. The piston 60 is configured to slide axially in response to an increase in hydraulic pressure in the first fluid chamber 56. When the piston 60 slides axially in response to the increase in hydraulic pressure, the piston 60 engages the first clutch 32 to connect the input shaft 36 to the motor 18. This is made possible by inner clutch plates attached to plate 38, which is non-rotatably connected to the input shaft 36, engaging outer clutch plates non-rotatably connected to the rotor 24.

The first fluid chamber 56 is sealed at seals 62, 64 on either radial end of the piston 60. The seals 62, 64 allow for relative axial movement of the piston 60 while fluidly sealing the first fluid chamber 56 from a second fluid chamber 66.

The second fluid chamber 66 provides fluid to the first and second clutches 32, 34. The second fluid chamber 66 is located between (and at least partially axially bound by) the piston 60 and a piston 68 of the second clutch 34. A plurality of arrows are shown in FIG. 2, indicating a flow pattern which will be described further below. The flow arrows are all within the second fluid chamber 66, indicating the flow of fluid within the second fluid chamber 66. Fluid in the second fluid chamber 66 is routed thereto through the housing 20 of the hybrid module 10. The piston 68 is configured to slide axially in response to an increase in hydraulic pressure in a third fluid chamber 70, also referred to as a torque converter clutch apply chamber. Fluid in the third fluid chamber 70 can be provided through a passageway in the transmission input shaft 16, for example. When the piston 68 slides axially in response to the increase in hydraulic pressure in the third fluid chamber 70, the piston 68 engages the second clutch 34 to connect the turbine shell 52 to the motor 18. This is made possible by inner clutch plates attached to plate 42, which is non-rotatably connected to turbine shell 52 and transmission input shaft 16, engaging outer clutch plates non-rotatably connected to the rotor 24.

The second fluid chamber 66 is sealed at seals 72, 74 on either radial end of the piston 68. The seals 72, 74 allow for relative axial movement of the piston 68 while fluidly sealing the second fluid chamber 66 from the third fluid chamber 70.

A dedicated torque converter clutch apply chamber, or third fluid chamber 70 is feasible by adding a seal 76 to an outer diameter of the turbine shell 52. The third fluid chamber 70 is sealed by seal 76 on turbine shell 52, and a seal 77 on the inner diameter of the turbine shell 52. The seal 76 allows turbine 46 to rotate freely relative to the impeller 44, but also maintains fluid pressure in the third fluid chamber 70 and maintains torque converter charge pressure within the turbine 46 of the torque converter.

Fluid flow through the second fluid chamber 66 will now be described. The fluid is provided in order to cool the clutches 32, 34, as well as the motor 18. The fluid enters the second fluid chamber 66 through a front of housing at 78. The fluid then enters the inner diameter of the clutch 32 via a passageway located axially between the piston 60 and the plate 38. The fluid passes between the inner and outer clutch plates of the first clutch 32, and exits the outer diameter of the clutch 32.

The fluid then flows axially through a wall assembly 80 axially separating the first clutch 32 from the second clutch. The wall assembly 80 includes a first wall 82 and a second wall 84. The first wall 82 provides a fixed surface for compression of the clutch 32 to be applied therein. Likewise, the second wall 84 provides a fixed surface for compression of the clutch 34 to be applied thereon. The first and second walls 82, 84 may be joined to one another at a radially-inner location. The first and second walls 82, 84 may also be radial extensions of the housing that radially separates the rotor 24 from the clutches 32, 34. The first and/or second walls 82, 84 may have axial holes therethrough to enable the fluid to flow in the axial direction from the first clutch 32 to the second clutch 34.

The fluid then enters the second clutch 34 at the radially outer portion or outer diameter thereof. The fluid passes radially inward through the second clutch 34 to cool the inner and outer clutch plates of the second clutch 34. In doing so, the fluid may pass on either axial side of plate 42.

The fluid exits the second clutch 34 and travels into a gap between the first and second walls 82, 84 via aperture 86. The aperture 86 may extend axially through the second wall 82, and provides an inlet into a gap located between the walls 82, 84. Once the fluid is between the first and second walls 82, 84, the fluid travels radially outward. The fluid then exits the gap between the walls 82, 84 at outlet 88, whereupon the fluid can spray and splash outward to cool the rotor 24.

The embodiments described above allow for a four-pass torque converter clutch functionality with the addition of only one port, as compared to two additional ports typically required with the implementation of a four-pass torque converter (e.g., a clutch apply chamber and a clutch compensation chamber). For example, previous designs of a four-pass torque converter may include four ports for hydraulic fluid, namely, ports at (i) an actuation chamber of the disconnect clutch, (ii) a chamber that provides cooling to the disconnect clutch and the electric motor, (iii) a torque converter clutch apply chamber, or a torque converter inlet, and (iv) a torque converter release chamber. Now, with the present design described herein, a four-pass torque converter clutch functionality for a hybrid module is provided with ports at (i) the actuation chamber 56, (ii) the common chamber 66 that provides cooling to the disconnect clutch 32, the electric motor 18, the torque converter clutch 34, as well as providing clutch compensation for the disconnect clutch and torque converter clutch, and (iii) the torque converter clutch apply chamber 70.

A benefit of the above-disclosed design is that the torque converter clutch 34 is functional as a four-pass clutch, and with this, the charge pressure in the torque converter clutch apply chamber 70 can be maintained to a minimum pressure at all times necessary to prevent torque converter cavitation.

Moreover, a common fluid chamber for both the disconnect clutch 32 and the torque converter clutch is provided, radially inward of the motor 18. This provides an improved packaging for a hybrid module 10 for a hybrid vehicle, in which packaging is constrained.

A thrust bearing 90 is provided at the interface between plate 42 and wall 84. The thrust bearing is configured to receive force due to torque converter charge pressure. The turbine 46 may be riveted to plate 92. Force or pressure from the turbine 46 is applied to the plate 92, and thus to plate 42. The thrust surface (e.g., bearing, washer, etc.) of the thrust bearing 90 receives this force.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

Parts List

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

10 hybrid module
12 hybrid drive unit
14 torque converter
16 transmission input shaft
18 electric motor
20 housing
22 stator
24 rotor
26 coils
28 center axis
30 hydraulic coupling
32 first clutch
34 second clutch
36 input shaft
38 plate
40 dampener assembly
42 plate
44 impeller
46 turbine
48 stator
50 rear cover
52 turbine shell 56 first fluid chamber
58 fluid reaction plate or reaction plate
60 piston
62 seal
64 seal
66 second fluid chamber
68 piston
70 third fluid chamber
72 seal
74 seal
76 seal
77 seal
78 part of housing
80 wall assembly
82 first wall
84 second wall
86 aperture
88 outlet
90 thrust bearing
92 plate

What is claimed is:

1. A hybrid module for a hybrid vehicle, the hybrid module comprising:
a first fluid chamber located axially between a reaction plate and a first piston, and radially inward of an electric motor;
a first clutch configured to mount radially inward of the electric motor, wherein the first piston is configured to slide axially to engage the first clutch to non-rotatably couple an input shaft to the electric motor in response to fluid pressure provided in the first fluid chamber;
a second fluid chamber located axially between the first piston and a second piston and radially inward of the electric motor;
a second clutch configured to mount radially inward of the electric motor, wherein the second piston is configured to slide axially to engage the second clutch to non-rotatably couple the electric motor to a transmission input shaft;
a torque converter configured to mount radially inward of the electric motor, the torque converter having a turbine shell; and
a third fluid chamber located axially between the second piston and the turbine shell, wherein the second piston is configured to slide axially to engage the second clutch in response to fluid pressure provided in the third fluid chamber.

2. The hybrid module of claim 1, wherein the first piston is configured to slide in a first axial direction to engage the first clutch, and the second piston is configured to slide in a second axial direction opposite the first direction to engage the second clutch.

3. The hybrid module of claim 1, wherein the third fluid chamber is located radially inward of the electric motor.

4. The hybrid module of claim 1, wherein the second fluid chamber includes an outlet facing radially outward at the electric motor such that fluid exiting the second fluid chamber contacts the electric motor.

5. The hybrid module of claim 1, wherein the first piston includes a first seal at a radially inner end thereof, and a second seal at a radially outer end thereof, wherein the first and second seals allow axial movement of the first piston, and wherein the first and second seals seal the first fluid chamber from the second fluid chamber.

6. The hybrid module of claim 1, wherein the second piston includes a first seal at a radially inner end thereof, and a second seal at a radially outer end thereof, wherein the first and second seals allow axial movement of the second piston, and wherein the first and second seals seal the second fluid chamber from the third fluid chamber.

7. The hybrid module of claim 1, wherein the first and second clutches are located within the second fluid chamber.

8. The hybrid module of claim 1, further comprising a wall assembly disposed within the second fluid chamber and axially between the first and second clutches.

9. The hybrid module of claim 8, wherein the wall assembly includes a first wall and a second wall axially spaced apart and defining a gap therebetween, wherein the second wall includes an inlet to receive fluid into the gap, and wherein the gap is aligned with an outlet facing radially outward toward the electric motor such that fluid exiting the second fluid chamber contacts the electric motor.

10. A hybrid module for a hybrid vehicle, the hybrid module comprising:
a first clutch configured to, when actuated, non-rotatably couple an input shaft to an electric motor;
a second clutch configured to, when actuated, non-rotatably couple the electric motor to a transmission input shaft;
an electric-motor housing configured to house the electric motor, the electric-motor housing having a radially-inner portion; and
a torque converter including a turbine shell slidably disposed along the radially-inner portion of the electric-motor housing via a seal.

11. The hybrid module of claim 10, wherein the first clutch is actuated by a first piston, and the second clutch is actuated by a second piston, the hybrid module further comprising:
a first fluid chamber located axially between a reaction plate and the first piston, and radially inward of the electric-motor housing; and
a second fluid chamber located axially between the first piston and the second piston and radially inward of the electric-motor housing.

12. The hybrid module of claim 11, further comprising:
a third fluid chamber located axially between the second piston and the turbine shell, wherein the second piston is configured to slide axially to engage the second clutch in response to fluid pressure provided in the third fluid chamber.

13. The hybrid module of claim 12, wherein the third fluid chamber is located radially inward of the electric-motor housing.

14. The hybrid module of claim 11, wherein the first piston is configured to slide in a first axial direction to actuate the first clutch, and the second piston is configured to slide in a second axial direction opposite the first direction to actuate the second clutch.

15. The hybrid module of claim 11, wherein the second fluid chamber includes an outlet facing radially outward to enable fluid exiting the second fluid chamber to contact the electric motor.

16. The hybrid module of claim 11, wherein the first and second clutches are located within the second fluid chamber.

17. The hybrid module of claim 11, further comprising a wall assembly disposed within the second fluid chamber and axially between the first and second clutches.

18. The hybrid module of claim 17, wherein the wall assembly includes a first wall and a second wall axially spaced apart and defining a gap therebetween, wherein the second wall includes an inlet to receive fluid into the gap, and wherein the gap is aligned with an outlet facing radially outward to enable fluid exiting the second fluid chamber to contact the electric motor.

19. A method of cooling a hybrid module of a hybrid vehicle, the method comprising:
   transmitting fluid through a housing and into a first fluid chamber that has a first clutch located radially inward of an electric motor;
   transmitting the fluid radially outwardly to cool the first clutch;
   directing the fluid from the first fluid chamber into a second fluid chamber that has a second clutch located radially inward of the electric motor;
   transmitting the fluid radially inwardly to cool the second clutch; and
   directing the fluid from the second fluid chamber into a wall assembly that axially separates the first and second fluid chambers.

20. The method of claim 19, further comprising transmitting the fluid radially outwardly within the wall assembly and onto the electric motor.

\* \* \* \* \*